United States Patent [19]

Smith

[11] 4,321,625
[45] Mar. 23, 1982

[54] CONTROL SYSTEM FOR PLURALITY OF VIDEO CAMERAS

[75] Inventor: William V. Smith, Memphis, Tenn.

[73] Assignee: Lectrolarm Custom Systems, Inc., Memphis, Tenn.

[21] Appl. No.: 159,172

[22] Filed: Jun. 13, 1980

Related U.S. Application Data

[63] Continuation-in-part of Ser. No. 60,463, Jul. 25, 1979, which is a continuation-in-part of Ser. No. 22,505, Mar. 21, 1979, Pat. No. 4,225,886, which is a continuation-in-part of Ser. No. 851,812, Nov. 16, 1977, Pat. No. 4,152,696.

[51] Int. Cl.³ .............................................. H04N 5/24
[52] U.S. Cl. ..................................... 358/210; 358/185
[58] Field of Search ................. 358/185, 210; 352/179

[56] References Cited

U.S. PATENT DOCUMENTS

| | | | |
|---|---|---|---|
| 3,050,713 | 9/1962 | Harmon | 340/172 |
| 3,312,941 | 4/1967 | Booth | 340/166 R |
| 3,508,201 | 4/1970 | Morale | 340/147 R |
| 3,569,741 | 3/1971 | Bolick | 307/244 |
| 3,670,180 | 6/1972 | Grossimon | 307/244 |
| 3,688,262 | 8/1972 | Liquori | 340/147 R |
| 3,719,828 | 3/1973 | Lipskin | 340/166 R |
| 3,932,714 | 1/1976 | Guimier et al. | 340/172 X |
| 4,028,620 | 6/1977 | Kitagawa et al. | 340/172 X |
| 4,070,650 | 1/1978 | Ohashi | 340/172 |
| 4,120,004 | 10/1978 | Coutta | 358/210 |
| 4,190,863 | 2/1980 | Dischert | 358/210 |

FOREIGN PATENT DOCUMENTS 1066232 10/1959 Fed. Rep. of Germany ...... 358/210

Primary Examiner—Michael A. Masinick
Attorney, Agent, or Firm—LeBlanc, Nolan, Shur & Nies

[57] ABSTRACT

A control system is provided for selectively generating one of a plurality of control signals with each signal corresponding to a particular predesignated function of a system such as a video camera system. Such a video camera system includes a plurality of video cameras, each of which can be individually controlled. The output signals from the control system are generated in response to constant voltage input signals produced by an input circuit. The input circuit is coupled to a control circuit associated with a video camera through a transmission line over which different constant level voltage input signals are transmitted. The input circuit enables the operator to first select the particular camera to be controlled and then to transmit the input signals to the control circuit for the selected camera. The voltage level of the input signal which is transmitted is selected from among a plurality of predetermined levels in dependence upon the control function to be achieved. The control circuit, in turn, receives the input signals and in response thereto will activate one of a plurality of switches for providing a corresponding output signal which serves to enable an appropriate camera function.

10 Claims, 10 Drawing Figures

CONTROL SYSTEM FOR PLURALITY OF VIDEO CAMERAS

CROSS REFERENCE TO RELATED APPLICATIONS

This patent application is a continuation-in-part of U.S. patent application Ser. No. 60,463 entitled "Control System", filed July 25, 1979, which is a continuation-in-part of co-pending U.S. patent application Ser. No. 22,505 entitled "Video Camera Control System", filed Mar. 21, 1979, now U.S. Pat. No. 4,225,886 which application is a continuation-in-part of Ser. No. 851,812 filed Nov. 16, 1977, now U.S. Pat. No. 4,152,696 issued May 1, 1979. The subject matter of both of these applications and the patent are hereby incorporated by reference.

BACKGROUND OF THE INVENTION

The present invention involves a video camera system having a plurality of video cameras and associated with each a control mechanism for providing a plurality of control signals for selectively enabling a corresponding plurality of control functions for each camera.

First, considering the references cited during the prosecution of applicant's U.S. Pat. No. 4,152,696 cited above, U.S. Pat. No. 3,932,714 to Guimier et al. discloses a remote electrical transmission system in which a control unit provides a different level voltage output, in dependence upon the position of a selector switch, to a receiver unit including a plurality of zener diodes and associated switching transistors which open or close different control circuits according to the positions in which the control selector switch is set. U.S. Pat. No. 4,028,620 to Kitagawa et al. discloses a system for selectively actuating electrical loads including an instruction unit having a switch mechanism with a plurality of contacts, and an output unit for generating respective output signals corresponding to the voltage signals from the instruction unit. U.S. Pat. No. 4,070,650 to Ohashi et al. discloses a digital signal transmission system in which control signals are either transmitted or not transmitted in accordance with the results of a comparison between set values stored in a decoder and digital signals transmitted from an encoder. When the values of the digital signals are greater than the value set in the decoder comparators, output signals are generated. The output signals are suspended if the values of the digital signals are smaller than those set in the decoder comparators.

In the majority of the known control systems, where it is desired to selectively control a plurality of different functions of a member being controlled, it is necessary that a different switch be included in the input circuit of the system for providing an appropriate signal for controlling each of these functions. Each of the signals is then coupled by a separate transmission line from the input circuit to the actual control circuit for activating the corresponding function. Representative embodiments of such systems are disclosed in U.S. Pat. Nos. 3,312,941 to Booth et al.; 3,508,201 to Morale; 3,688,262 to Liquori and 3,719,828 to Lipskin. Since in each of these devices, there is almost an exact correspondence between the number of input selection members and the number of output functions that can be controlled by the system, there is a direct linear relationship between the control capability of the system and the size of the input device. Thus, as the intended use of the system expands, the size and cost of the control system expands at the same rate. Furthermore, since in each of these systems the is almost always a direct link, i.e., transmission line, between each of the input selecting members and the control circuit, it is difficult to separate the input circuit and the control circuit by any significant distance unless one is willing to utilize a large quantity of wiring between the two circuits.

The patent to Liquori is possibly of particular interest since the embodiment disclosed by this patent was designed for controlling a plurality of audio-visual devices, which is likewise an area in which the control system of the present invention can be of particular utility. In the system disclosed by the patent to Liquori each of the input buttons is directly connected by a separate line to a remote control assembly, which assembly provides an appropriate output signal that is supplied to each of the audio-visual devices to be controlled.

While several attempts have been made to limit the number of input selecting members which must be utilized in order to control a plurality of control functions, these systems have generally encountered problems of either simultaneously activating a plurality of control functions or entailing such a cumbersome method for avoiding such simultaneous activation that the system becomes impractical. Examples of such systems are disclosed in U.S. Pat. Nos. 3,050,713 to Harmon and 3,569,741 to Bolick et al.

The patent to Harmon discloses a circuit having a plurality of thyratrons that are selectively activated based upon the level of the signal supplied to a signal source. Each of the thyratrons is activated only when an applied input signal is above a corresponding predetermined level. When the thyratron is activated, it generates an output signal for enabling a corresponding control function. Thus, for each control function to be activated by the control circuit, it is necessary to have a separate thyratron. In order to prevent simultaneous actuation of more than one thyratron at a time, a plurality of delay circuits is employed. These delay circuits are coupled with the thyratron such that the thyratron which is activated by the lowest level signal is not activated until the longest delay period has passed. Thus the higher the level of the signal, the shorter the time period that signal is applied while conversely the lower the level, the longer the time period the signal is applied. The duration of the applied signals are selected so as to correspond with the delay circuits coupled to the thyratrons so that the signal only exists long enough to activate the appropriate thyratron.

The patent to Bolick et al. discloses a control circuit for selectively activating different operations within a recording device. The circuit includes a plurality of transistors, each of which is activated when the voltage applied to its base is above a predetermined level. In the system disclosed by this patent, if the level of the applied voltage is sufficient to activate the third level transistor, then the firt and second level transistors will be simultaneously actuated.

One other control circuit which has been developed in the prior art is that shown in U.S. Pat. No. 3,670,180 to Grossimon et al. In contrast to the systems disclosed in the other patents, however, in accordance with the embodiment disclosed by this patent a plurality of SCRs are sequentially activated by a series of input signals. The values of the input signals sequentially increase and each of the signals serve to actuate a corresponding SCR. The purpose of the control system disclosed by this patent is to fire a series of rockets in a predetermined order and thus the SCRs need only be actuated in accordance with this predetermined order and it is impossible to selectively actuate the SCRs in any other order.

All the systems disclosed by the patents discussed above involve extremely sophisticated and cumbersome circuitry for carrying out a plurality of control functions. If only a relatively few functions are to be controlled by the system, the utilization of separate circuits for each function may not present a significant burden. As the number of functions to be controlled grows, however, the size of the system grows at the same rate thereby increasing the complexity and cost of the system.

SUMMARY OF THE INVENTION

An object of the present invention is to provide an improved and simplified video camera system and control mechanism.

Another object of the present invention is to provide a video camera system having a plurality of video cameras that are controlled by utilizing a multi-function control mechanism that overcomes the drawbacks of previously known systems as discussed above.

A further object of the present invention is to provide a multi-function control system for selectively enabling one of a plurality of control functions of a video camera in response to a single input signal.

Still another object of the present invention is to provide a video camera control system including a plurality of video cameras for selectively enabling a plurality of camera functions for each camera in response to a signal received from an input circuit.

Still a further object of the present invention is to provide a video camera control system for selectively providing a plurality of output signals to control the functions of a video camera, with each output signal being dependent upon the level of a voltage signal applied within this system, by utilizing a plurality of zener diodes each having a different breakdown voltage so that when each zener diode breaks down, it provides a corresponding output signal.

These objects are accomplished in accordance with the present invention by the utilization of a control circuit having a plurality of zener diodes with each zener diode having a different breakdown voltage so that each is actuated in dependence upon a different level input signal. The actuation of each higher level zener diode also generates a corresponding blocking signal for blocking the output of the next lower level zener diode so that only a single output signal is generated by the system. The input signals to the system are generated by an appropriate input circuit which is capable of providing a constant level voltage with the level of the voltage varying in dependence upon which zener diode is to be activated. The input circuit is coupled to the control circuit through a single transmission line over which the constant level voltage is sent to all of the zener diodes of the control circuit.

More specifically, the present invention involves a video camera system having a plurality of video cameras each of which can be individually and separately controlled. The video camera system includes a control system for selectively providing a plurality of control signals to a camera selected for control, with the signals being provided one at a time with each serving to enable a separate control function to operate the selected video camera, which is capable of a plurality of different functions. The selection of the control signals depends upon input signals which are received from an input circuit. Each of the input signals has a constant voltage and the level of the input signal is selected from a plurality of predetermined levels. These input signals are provided to a control mechanism that includes a plurality of zener diode switches. Each of the zener diode switches is activated when the input signal is above a corresponding predetermined level with the predetermined level for each of these zener diodes being different from the level necessary for activting the other zener diodes. Thus, each zener diode which has been actuated provides an appropriate switching signal. The output from each of the zener diodes is in turn coupled to a transistor switching circuit. The output of each zener diode, except for that zener diode corresponding to the lowest voltage level, is also coupled to a lockout circuit which provides a blocking signal when activated. This blocking signal from the lockout circuit is applied to the output of the next lowest level zener diode for blocking that output from reaching the corresponding transistor switching circuit. Thus, if the third level zener diode is actuated, although the first and second level zener diodes are also actuated, the lockout circuits block the outputs of those zener diodes from reaching their corresponding transistor switching circuits. Hence, the only transistor switching circuit to receive a signal would be the third level transistor circuit. An output circuit is coupled to each of the transistor switching circuits and in response to a signal from the transistor switching circuits enables one of the control functions of the video camera.

Before providing the control signals, the operator of the input control console is able to select which video camera will be controlled. An input mechanism that includes a decimal multiplex decoder enables the operator to enter a two digit code representing the video camera being selected. The decoder translates the inputed numerical code into signals for actuating corresponding switches of a selection switching mechanism which couples the selected video camera to receive the input voltage signals.

While there is a separate control mechanism associate with each video camera, these mechanisms are controlled from an operator's console. At the console is an input mechanism for the control system, which allows the operator to manually select the functions to be carried out after the operator has selected the camera to be controlled. For each function selected there is a different level voltage signal produced. Typically there are seven different voltage levels that are used, which levels correspond to the breakdown voltage levels for the zener diodes that are utilized. These voltage levels are 5.1, 8.2, 11, 14, 17 20 and 24 volts. If there are more than seven control functions, then a second control mechanism is used which receives input voltages from the input mechanism. Thus for a seven function control there is one signal transmission wire plus ground extending from the console to the camera control mechanism; for a 14 function system there are two transmission wires plus ground; and for each additional seven functions there is one additional signal transmission wire.

The control system of the present invention can be advantageously utilized in connection with controlling along with the video camera other associated equipment within the area surrounding the location of the camera. For example, the control system can be used for controlling the doors opening into the area or turning on and off the lights. The system is especially suitable for controlling various movements of the camera such as panning and tilting and for controlling the iris, focus and zoom functions of the camera. The system also can be adapted to achieve automatic positioning of the camera in a plurality of predetermined positions in response to the different level voltage input signals.

Each of the video cameras in the system can be directed by the operator to assume any one of several predetermined positions, i.e., vertical and horizontal orientation as well as field of view of the camera. In addition to the predetermined positions for each video camera, each camera can be set in a predetermined emergency position, which operation can be carried out by activating a single switch at an input console. In addition, each of the video cameras can be programmed to leave any of its designated positions at predetermined intervals, scan through a set sweep angle and then return to one of its designated positions. The time interval can be randomly selected by a random time generator and typically would be on the order of 0-10 minutes. The sweep angles are typically between 45° and 360°.

DESCRIPTION OF THE PREFERRED EMBODIMENTS

Figure 1:
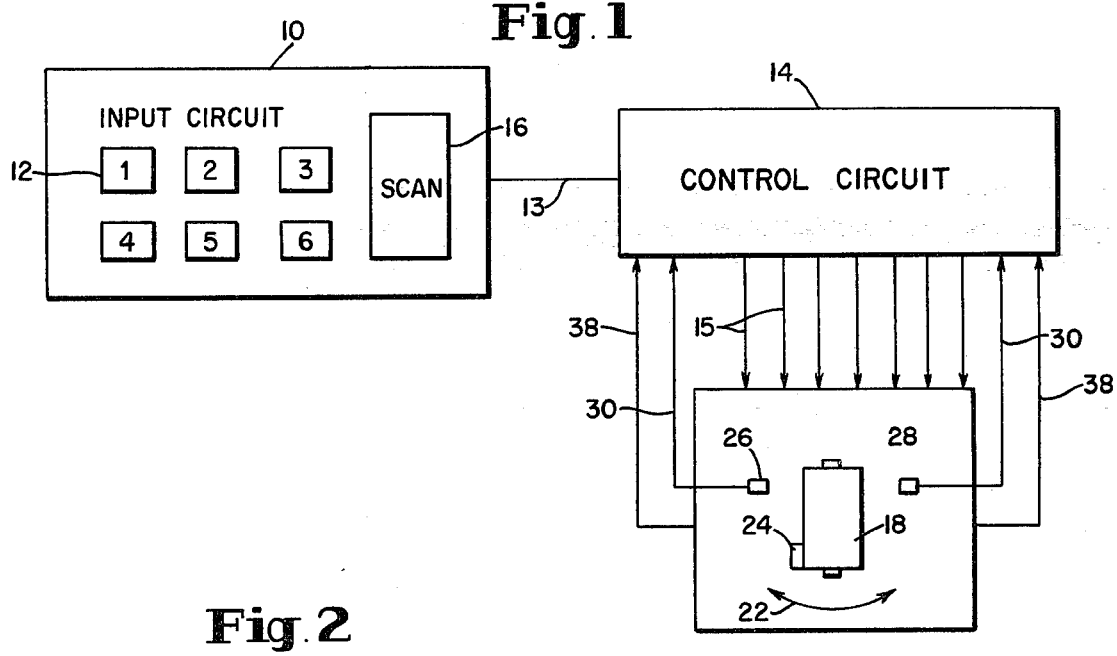
FIG. 1 is a basic block circuit diagram illustrating the input and control circuits for a video camera control system embodying the principals of the present invention.

As shown in FIG. 1, the control system includes two basic circuits, an input circuit 10 and a control circuit 14. The input circuit provides a plurality of constant voltage level signals through transmission line 13 to control circuit 14. In the illustrated embodiment, input circuit 10 is capable of providing seven different voltage signals. The particular signal which is applied is dependent upon which of a plurality of buttons 12 or scan button 16 is pressed. Thus, the operator of the system presses one of the buttons which then provides an appropriate signal to the control circuit. The control circuit, in dependence upon the input signals that are received, provides an output signal along one of its output lines 15 to selectively actuate various control functions of a video camera 18.

Figure 4:
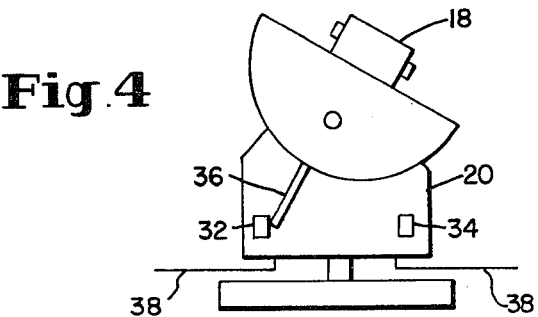
FIG. 4 is an elevational view of a swivel and tilt mounting unit used to support a video camera.

Referring to FIGS. 1 and 4, video camera unit 18 is mounted on a rotatable pedestal 20 for rightward and leftward movement as indicated by arrow 22. A magnet 24 is mounted for movement with camera unit 18 to actuate a pair of magnetically operated position sensing switches 26 and 28 to provide position feedback signals to control circuit 14 via a pair of input lines 30 to indicate right and left camera orientation. The video camera unit also includes a pair of position sensing switches 32 and 34 (FIG. 4), e.g., microswitches, actuated by a lever 36 on the camera tilt mechanism to provide position feedback signals to control circuit 14 via a pair of input lines 38 to indicate the up or down orientation of the camera.

Figure 2:
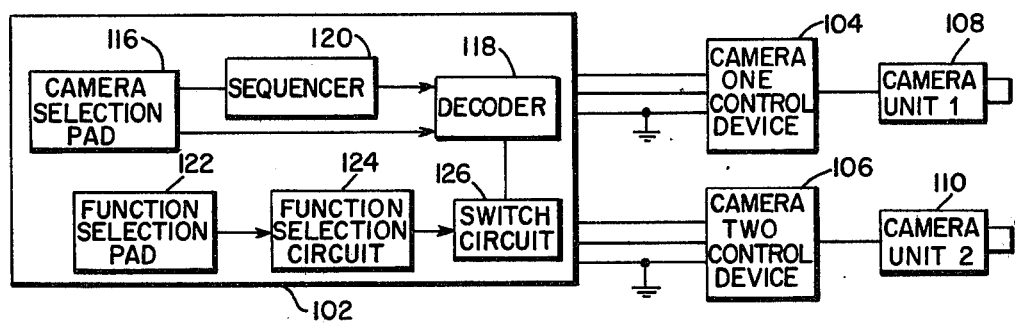
FIG. 2 is another basic block circuit diagram for a video camera system having a plurality of video cameras capable of being controlled in accordance with the principals of the present invention.
Figure 3:
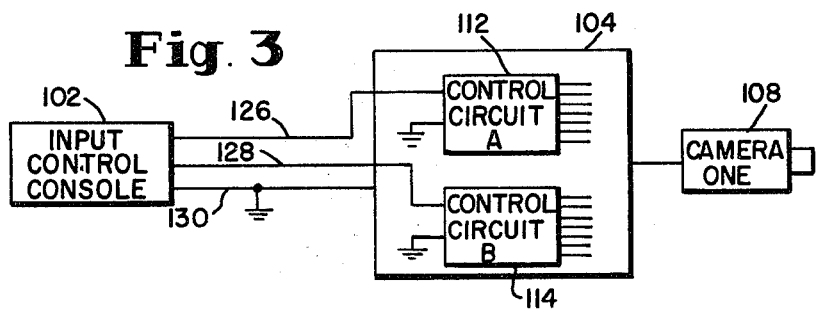
FIG. 3 is a block circuit diagram of a portion of the system illustrated in FIG. 2.

In the video camera system a plurality of video camera units can be controlled from the single input control console. As illustrated in FIG. 2, input control console 102 has outputs going to two control devices 104 and 106. Control device 104 is for camera unit 108 and control device 106 is for camera unit 110. As shown in FIG. 3, control device 104 includes control circuit A 112 and control circuit B 114. Thus control circuits A and B, 112 and 114, are capable of controlling 14 functions, 7 functions each, for camera unit 108.

While only two camera units have been illustrated in FIG. 2 as being controlled by input control console, any number of camera units can be controlled by console 102. In fact, console 102 is normally capable of handling up to 100 video camera units. Before applying the actual control signals to the camera units, the particular camera unit to be controlled is selected. The operator of input control console 102 will manually input a selected numerical code into camera selection pad 116 which code represents the particular camera unit that the operator desires to control from input control console 102. This numerical code is then fed to decoder 118 which provides appropriate signals for controlling switch circuit 126. Switch circuit 126 can be basically a relay circuit then enables the functions that are selected by the operator to be coupled to the particular camera unit selected.

As an alternative to selecting a particular camera unit for control, the operator can select a group of camera units, such as, for example, units 20-29 or 40-49. In selecting such a group of units, the operator first enters the first digit into camera selection pad 116 which selects the particular group of units. The operator then activates sequencer 120 which sequentially moves through all the units of the particular group selected. These signals are again applied to switch circuit 126 through decoder 118.

Once the camera to be controlled is selected, the operator then selects the function to be performed on function selection pad 122. The form of function selection pad 122 can be similar to that illustrated by input circuit 10 in FIG. 1. However, while input circuit 10 only includes seven functions, function selection pad 122 in FIG. 2 is capable of allowing the operator to select between fourteen functions. Fourteen different functions are possible since there are two control circuits, 112 and 114, within each of the control devices, such as control device 104. For this purpose, there are two transmission wires plus ground interconnecting input console 102 with each of the control devices.

As illustrated in FIG. 3, transmission wire 126 is connected to control circuit A 112. Transmission wire 128 is connected to control circuit B 114. Finally there is a single ground wire for interconnecting the ground of the control device 104 with the ground of input control console 102. Additional functions can be provided for by adding additional control circuits and additional transmission wires. After carrying out certain functional operations with the selected camera, the operator then can select another camera to be controlled.

Figure 5:
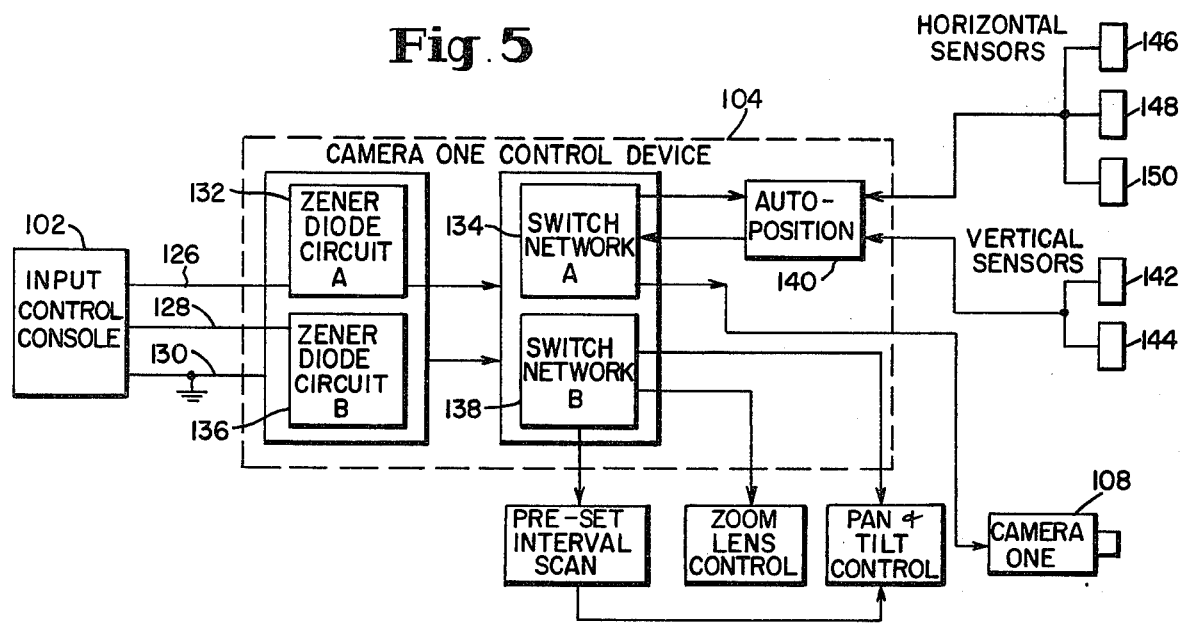
FIG. 5 is a more detailed block circuit diagram of that portion of the system illustrated in FIG. 3.

A more detailed illustration of control device 104 and the related equipment for controlling the operation of camera unit 108 is illustrated in FIG. 5. Control device 104 which is set up to be able to carry out fourteen functions includes control circuit A 112 and control circuit B 114. Control circuit A includes a zener diode circuit A 132 and a switch network A 134. Similarly control circuit B includes zener diode circuit B 136 and switch network B 138. The input voltage signals transmitted by input control console 102 along transmission wire 126 are supplied to zener diode circuit 132 while the input voltage signals transmitted along transmission wire 128 are supplied to zener diode circuit 136.

As will be described further below, each of the zener diode circuits includes a plurality of zener diodes which have different breakdown voltages. In response to the breakdown voltages, the zener diodes are activated. The outputs from the zener diodes are transmitted to corresponding switches of the corresponding switch network. The output of each zener diode that is activated will block out the output from the zener diodes activated by lower level voltages, as further explained below. Thus the activation of the zener diodes of circuit 132 will lead to the activation of one of the switches of switch network 134. Similarly the activation of zener diodes within circuit 136 will lead to the activation of one of the switches of switch network 138.

The output from switch networks 134 and 138 are coupled to various control devices for controlling different functions of camera 108. Thus, for example, outputs from switch network 134 can be connected to an auto positioning mechanism 140. The auto positioning mechanism is attached to a plurality of vertical sensors 142 and 144 and horizontal sensors 146, 148 and 150. These sensors, which can be microswitches, when activated will sense when a contact located on the camera comes into contact with the sensor such as previously described above in connection with the operation of the camera unit illustrated in FIG. 4. Thus auto positioning mechanism 140 will move camera 108 until it has reached a preselected position where a contact member attached to the camera contacts an activated sensor at which time a feedback signal to switch network 114 can terminate the operation of auto position mechanism 140.

Switch network 134 also contain a switch for turning camera 108 off and on. Switch network 138 is illustrated as controlling pan and tilt control 152, zoom lens control 154 and pre-set interval scan 156. Pan and tilt control 152 controls the panning and tilting movements of camera 108. Zoom lens control 154 can be operated to cause the lens of camera 108 to vary from its wide angle to its telescopic positions. Pre-set interval scan 156 is used for causing pan and tilt control 152 to move camera 108 through a plurality of preselected positions.

Pre-set interval scan 156 randomly selects various preselected positions to which camera 108 should be moved. In addition, the time interval that camera 108 spends within each of these preselected positions also is determined by pre-set interval scan circuit 156. The interval scan circuit can be directly connected to pan and tilt control circuit 152 or can be coupled to the pan and tilt control by a feedback through the switch networks. In either situation, the interval scan circuit can be provided with a plurality of zener diode circuits with each zener diode having a different breakdown voltage. Upon application of the various breakdown voltages, one of the zener diodes is activated which provides a control signal for moving the camera into the preselected position. After a set period of time a new voltage is applied and the camera and is then moved into a different corresponding preselected position.

Both above and throughout the specification reference has been made to control circuits that include zener diode circuits and switching circuits. Such circuitry has been extensively discussed in applicant's prior U.S. patent and applications for patents from which the present application stems. However, a brief description of such circuitry is presented below.

Figure 6:
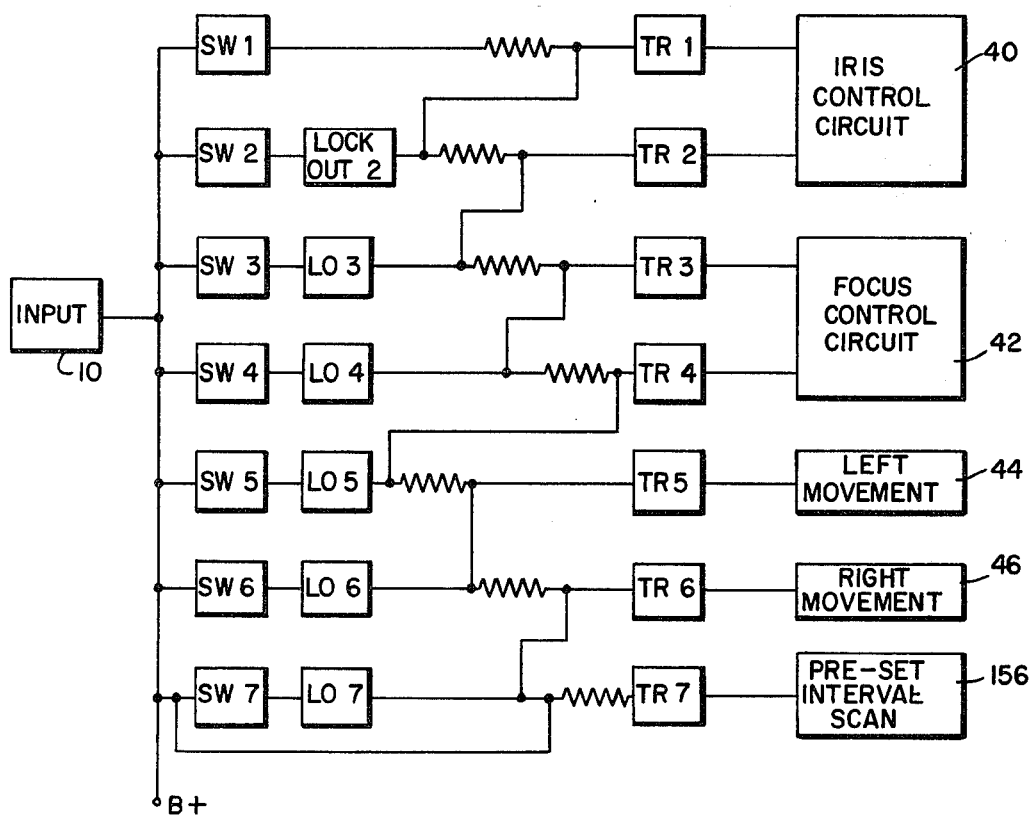
FIG. 6 is a more detailed block circuit diagram of the input and control circuits of the present invention.

As shown in FIG. 6, each of the signals from input circuit 10 is provided to switching circuits SW-1 through SW-7. Each of these switching circuits is actuated only when the applied votage is above a certan predetermined level with the predetermined level associated with each switching circuit being different. In the embodiment being shown in FIG. 7, as an example of such circuitry, each of the switching circuits is shown to be a zener diode with each zener diode having a different breakdown voltage. In the embodiment illustrated, the breakdown voltage for each of the zener diodes is shown next to the diode. Each of the diodes only passes current when the applied voltage exceeds its breakdown voltage. Thus if a voltage in excess of 11 volts is applied, then the first three zener diodes will all conduct current, i.e., switches SW-1, SW-2 and SW-3 will be actuated. The outputs from each of switches SW-1 through SW-6 is in turn coupled to a corresponding transistor switching circuit, TR-1 through TR-6. The input to switch SW-7 is also applied to transistor switching circuit TR-7.

In the case of the outputs from switching circuits SW-2 through SW-7, the output signal is first fed through a corresponding lockout circuit, LO-2 through LO-7. Each of the lockout circuits upon being actuated provides an appropriate blocking signal which is applied for blocking the output signal from the next lowest level switching circuit. In this manner, only signals from the highest level switching circuit that is actuated pass through to the corresponding transistor switching circuit. In turn, the actuated transistor switching circuit when actuated provides a corresponding output signal.

The output signals from transistor switching circuits TR-1 and TR-2 are applied to an iris control circuit 40 to control the opening and closing of the aperture of the camera lens. Similarly, the output signals from transistor switching circuits TR-3 and TR-4 are applied to a focus control circuit 42 to control the focus of the camera lens. The output of transistor switching circuit TR-5 is applied to an output circuit 44 to control leftward movement of camera 18, while the output of transistor switching circuit TR-6 is applied to an output circuit 46 to control rightward movement of the camera. The output signal produced by transistor switching circuit TR-7 is applied to output circuit 156 which initiates an automatic scan function for the camera at predetermined intervals.

Figure 7:
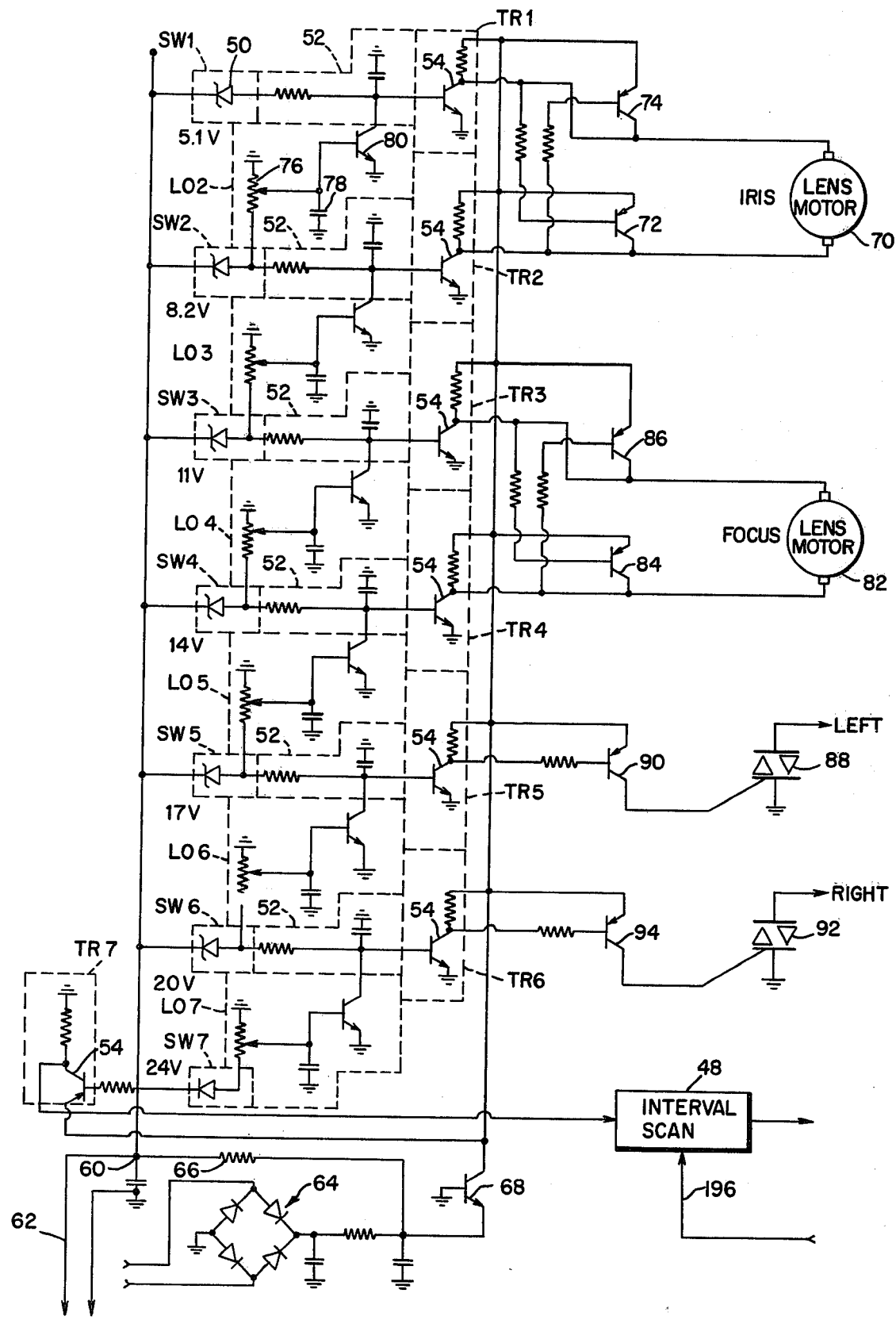
FIG. 7 is a representative schematic diagram illustrating one portion of the control device used to actuate various functions of the video camera.

Referring to FIG. 7, there is an exemplary embodiment of the circuitry that can be utilized in carrying out the present invention. As previously described, each of the switching circuits, SW-1 through SW-7, includes a zener diode 50. Referring to first switching circuit SW-1, it is seen that the output of the zener diode 50 is supplied to transistor switching circuit TR-1 after passing through an R-C time constant circuit 52. The time constant circuit allows any transients in the signal to be eliminated prior to applying the signal to the base of a transistor 54 of transistor switching circuit TR-1. A high gain transistor can be used for transistor 54. Similarly, each transistor switching circuit TR-2 through TR-6 is operable by its respective switching circuit SW-2 through SW-6. In the case of switching circuit SW-7, however, transistor switching circuit TR-7 is coupled to the input of switching circuit SW-7.

Each zener diode 50 of switching circuits SW-1 through SW-7 is coupled to a common input point 60 which receives voltage signals via a conductor 62 from the input circuit. A full wave rectifier circuit 64 produces a DC operating voltage which is applied via a resistance 66 to input point 60. The DC voltage is also employed as a bias for transistor switching circuits TR-1 through TR-7 via a bipolar transistor 68.

The iris control circuit includes a lens motor 70 (FIG. 4) for controlling the size of the lens aperture in the camera and a pair of transistors 72 and 74 operable by transistor switching circuits TR-1 and TR-2, respectively. Normally, transistor switches TR-1 and TR-2 are non-conducting to apply equal bias voltages to both inputs of lens motor 70. When the input voltage at point 60 equals or slightly exceeds 5.1 volts, the breakdown voltage of the first zener diode in switching circuit SW-1, transistor switching circuit TR-1 is rendered conductive to ground the corresponding input of lens motor 70 and actuate transistor 72 to drive the lens motor in a predetermined direction to change the size of the lens aperture. If the voltage signal applied by the input circuit to point 60 equals or slightly exceeds 8.2 volts, the breakdown voltage of the second zener diode in switch SW-2, then the current that passes through that zener diode will supply a signal through lockout circuit LO-2 which serves to block the output of switching circuit SW-1 from activating transistor switching circuit TR-1. The lockout circuit includes a bias resistor 76 and a capacitor 78 which form an R-C time constant for a transistor 80 of the lockout circuit. As a result, only transistor switching circuit TR-2 is rendered conductive to ground the other input of lens motor 70 and actuate transistor 74 to drive the lens motor in the opposite direction.

Similarly, the focus control circuit includes a lens motor 82 (FIG. 7) for controlling the focus of the camera lens and a pair of transistors 84 and 86 operable by transistor switching circuits TR-3 and TR-4, respectively. The operation of the focus control circuit is substantially identical to the operation of the iris control circuit described above. When the input voltage at point 60 equals or slightly exceeds 11 volts, lens motor 82 is driven in a predetermined direction to change the focus of the camera, and when the input voltage equals or slightly exceeds 14 volts, the lens motor is driven in the opposite direction.

Leftward movement of the camera is controlled by a triac 88 having its gate electrode coupled via a transistor 90 to the output of transistor switching circuit TR-5. Similarly, rightward movement of the camera is controlled by a triac 92 having its gate electrode coupled via a transistor 94 to the output of transistor switching circuit TR-6. When the input voltage at point 60 equals or slightly exceeds 17 volts, the zener diode of switching circuit SW-5 breaks down to actuate transistor switching circuit TR-5 to drive transistor 90 into conduction and apply an enabling signal to the gate electrode of triac 88 which activates a camera drive mechanism (not shown) to turn the camera leftward. Similarly, when the input voltage at point 60 equals or slightly exceeds 20 volts, triac 92 is actuated to operate the camera drive mechanism to turn the camera.

Interval scan control circuit 156 (FIG. 7) is actuated by transistor switching TR-7 and it is designed to automatically advance the camera through a predetermined sequence of positions at predetermined time intervals and to stop the camera at a predetermined rest position between the scan intervals. If the input voltage at input 60 equals or slightly exceeds 24 volts, transistor switching circuits TR-1 through TR-6 are blocked and transistor switching circuit TR-7 is activated to operate the automatic scan control circuit.

For controlling other functions of the video camera similar control circuits such as that described above are provided. The number of functions that can be carried out by any single control circuit is limited to the number of zener diodes with different breakdown voltages that are utilized unless a single zener diode is used for simultaneously controlling more than one function.

Figure 8:
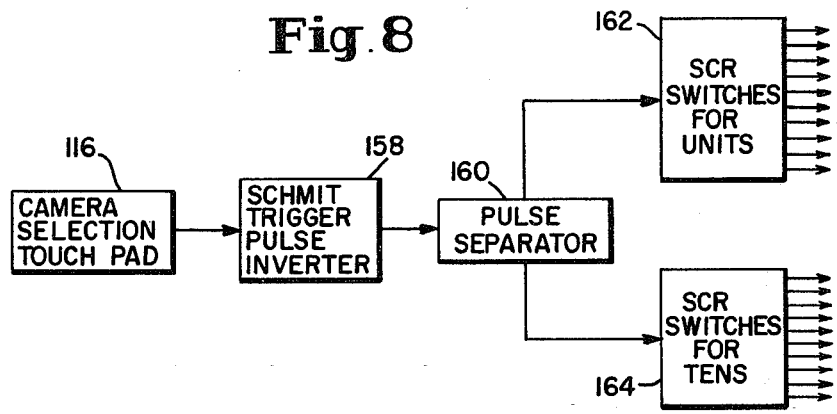
FIG. 8 is a block circuit diagram of the decoder in the input control console of the present invention.

As previously discussed, before applying the functional control signals within the input control console 102, the operator must select which camera is to be controlled. Such selection is made by the operator entering a two digit code in a camera selection touch pad 116, such as shown in FIG. 8. The output of the touch pad is connected to a decoder 118. Decoder 118 includes a Schmitt trigger pulse inverter that generates the pulses that are provided at the outputs of the decoder. A pulse separator 160 separates the pulses so that they are first applied at the 10's position (the first digit of the code) and then applied to the unit's position (the second digit of the code). A set of SCR switches for the 10's position 164 provides an output signal on a line that corresponds to the first digit selected by camera touch pad 116. Next, a set of SCR switches for the unit's position 162 provides an output signal on a line corresponding to the unit's digit selected by camera selection touch pad 116. The outputs from SCR switch circuits 162 and 164 are provided to a switch circuit 126 that then selects a position that corresponds to the particular camera that has been selected by the operator for control by the input control console.

After the particular video camera to be controlled has been selected, the operator then selects the particular function to be carried out through function select pad 122. This function select pad can be similar to input circuit 10 illustrated in FIG. 1 if there are only seven functions being carried out. For each function there is a separate manually operated input function selection member. The output from function select pad 122 is provided to function selection circuit 124 and from there through switch circuit 126 to the particular camera that has been selected for control. After the desired functions for one camera have been carried out, the next camera to be controlled can be selected.

Figure 9:
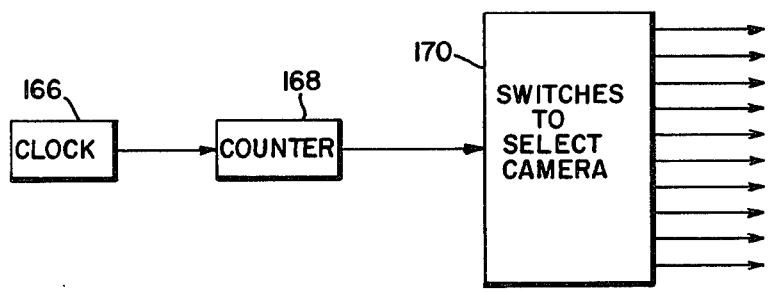
FIG. 9 is a block circuit diagram of the sequencer in the input control console in accordance with the present invention.

As an alternative to selecting a particular video camera to be controlled by input console 102 it is possible for the operator to select a group of cameras. Thus, the operator can select, for example, all of the cameras in the 20's group, i.e. cameras 20-29, or the 40's group. In order to carry out such an operation, the operator first selects the digit for the 10's position through camera selection pad 116. After selecting the first digit, the operator then actuates sequencer 120 which generates the signals for activating all of the units within the selected 10's group. The basic circuitry of sequencer 120 is illustrated in FIG. 9. The sequencer includes a clock 166 which determines the time interval for selecting each of the unit members of the selected group. The output from clock 166 is provided to a counter 168. In turn, the output of counter 168 steps through each of the switches for selecting the particular camera unit within the group. The switches to which the output of the counter is connected is designated by box 170 in FIG. 9. The output of switches 170 then can be provided through decoder 118 to switch circuit 126.

Figure 10:
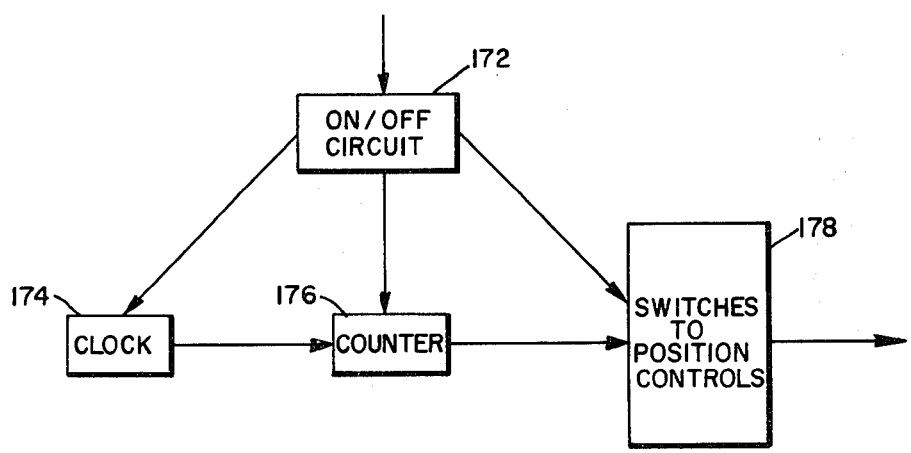
FIG. 10 is a block circuit diagram of the pre-set interval scan of the control device of the present invention.

When pre-set interval scan circuit 156 is actuated, a signal is received by on/off circuit 172 which turns on the components of scan circuit 156, which are shown in FIG. 10. Upon actuation, a clock 174 generates clock pulses for controlling a counter 176. Counter 176 provides output signals for causing the camera to move through each of the preselected positions. Normally, the output from counter 176 is a random output so that the interval scan need not proceed in a particular pre-set pattern. The output from counter 176 is supplied to switches 178 for controlling the position controls. As previously discussed, the output from switches 178 can be either directly coupled to pan and tilt controls 152 or can be fed back through the switch network for controlling the movement of the camera. Each of the outputs from switches 178 corresponds to a particular preselected position which can be set with the use of the microswitches as previously described above.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A video camera system comprising:
a plurality of movable video cameras;
controlled means coupled to each of said video cameras for causing movement of the associated said video camera;
input control means including camera selection means for enabling selection of one of said video cameras for control by said input control means and input voltage generating means for generating a plurality of different voltage level input signals, with each of such input voltage signals serving to enable a separate control function of said controlled means for the selected said video camera;
a plurality of video camera control mechanisms, each being associated with one of said video cameras, each of said video camera control mechanisms including: a plurality of first switching means coupled to receive the input voltage signals from said voltage generating means, each of said first switching means being activated when the input voltage signal is above a corresponding predetermined level with the predetermined level for each of said first switching means being different and blocking the input of others of said first switching means that are normally actuated at lower voltage levels so that only one of said first switching means provides an output in response to a single input voltage signal; and a plurality of first output means for selectively controlling different functions of said controlled means for said video camera being controlled, each of said first output means being coupled to the output of one of said first switching means and causing one of the functions of said video camera when receiving a first switching signal from the corresponding said first switching means.

2. A system according to claim 1 wherein input control means further includes function selection means for enabling a plurality of functions to be carried out by a selected one of said video camera control mechanisms to be individually manually selected.

3. A system according to claim 2 wherein each of said video camera control mechanisms further includes: a plurality of second switching means coupled to receive the input voltage signals from said voltage generating means, each of second switching means being activated when the input voltage signal is above a corresponding predetermined level with the predetermined level for each of said second switching means being different and blocking the output of others of said second switching means that are normally actuated at lower voltage levels so that only one of said second switching means provides an output in response to a single input voltage signal; and a plurality of second output means for selectively controlling the different functions of said video camera being controlled, each of said second output means being coupled to the output of one of said second switching means and causing one of the functions of said video camera when receiving a second switching signal from the corresponding said second switching means.

4. A system according to claim 3 wherein camera selection means includes manually actuable selection means for generating a coded signal corresponding to the selected video camera and decoding means for enabling the input voltage signals to be coupled to the video camera selected for operation.

5. A system according to claim 4 wherein said decoding means is a decimal multiplex decoder.

6. A system according to claim 1, 2 or 3 wherein said video camera control mechanisms further include positioning means coupled to outputs of said first and second output means for moving the selected said video camera system into one of a plurality of preselected positions.

7. A system according to claim 6 wherein said video camera control mechanisms further include interval scan means for causing a selected said video camera to move through each of its plurality of preselected positions.

8. A system according to claim 7 wherein said interval scan means randomly selects the order of the preselected positions to which said video camera will be moved.

9. A system according to claim 7 wherein said interval scan means includes: timing means for determining the dwell time of said video camera in each of the preselected positions; counting means for randomly selecting the order of the preselected positions to which said video camera will be moved; and interval scan voltage generating means for providing the appropriate voltage level signal corresponding to the selected preselected position.

10. A system as defined in claim 1, 2 or 3 wherein each of said switching means includes: a zener diode having a predetermined breakdown switching voltage with such breakdown voltage of said zener diode being different from the breakdown voltage of said zener diodes of the other said switching means of the respective said plurality of switching means such that when said switching means receives an input signal above the predetermined breakdown voltage of the corresponding said zener diode said switching means will provide a switching signal.

* * * * *